Jan. 26, 1960 V. E. LALLY 2,922,840

WEATHER CHART FACSIMILE SYSTEM

Filed Oct. 24, 1958 2 Sheets-Sheet 1

INVENTOR:
VINCENT E. LALLY

BY Edward M. Farrell
ATTORNEY

Jan. 26, 1960

V. E. LALLY 2,922,840

WEATHER CHART FACSIMILE SYSTEM

Filed Oct. 24, 1958

2 Sheets-Sheet 2

INVENTOR:
VINCENT E. LALLY
BY Edward M. Hassell
ATTORNEY 2,922,840

WEATHER CHART FACSIMILE SYSTEM

Vincent E. Lally, King of Prussia, Pa., assignor to Tele-Dynamics Inc., a corporation of Pennsylvania Application October 24, 1958, Serial No. 769,478
7 Claims. (Cl. 178—6.6)

Figure 1:
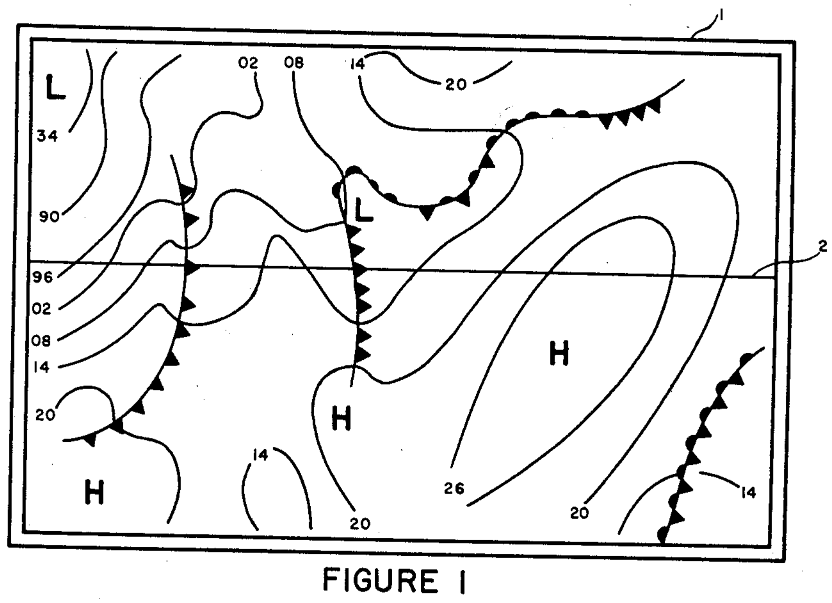

This invention related to facsimile systems, and more particularly to means for communicating weather data information from a weather chart at a high rate of speed.

Many present day facsimile systems involve transmission over a voice-quality telephone line at one line per second on an 18" line length. There are 96 lines per inch transmitted, so that an 18" x 12" weather map takes approximately 19.2 minutes for transmission. The resolution of this map is considerably less than 96 lines per inch. Attempts have been made to transmit at two lines per second but these have been only partially successful over short distances. For long distances with the limited bandwidth of the voice-quality channel, results are poor. The "96 points per inch" resolution drops back to less than one-half of 96.

Other systems have employed various scanning and coding techniques to provide efficient use of the available bandwidth. One such system involving the transmission of coded signal is described in an article by Lally, Myers, and McInnis: "The Information Content of Weather Charts," Bulletin of American Meterorological Society, February 1957, pages 62–66. The system described in this article uses a mechanical X—Y plotter to reproduce the lines of an originally drawn map. Data is transmitted as incremental changes in digital form. The difficulty with the system is to produce a reliable receiver at an economical price. A second and related problem is that the use of the method described for transmission of data including large groups of numbers and symbols results in a highly complex system.

It is an object of this invention to provide a facsimile system for communicating analyzed weather charts at a much greater speed than facsimile systems used heretofore.

It is a further object of this invention to provide a facsimile system for communicating analyzed weather charts with a considerable reduction in the cost and complexity of the terminal equipment over that existing heretofore.

It is still a further object of this invention to provide an improved weather chart facsimile system in which the bandwidth requirements are considerably reduced over those existing heretofore.

In accordance with the present invention, a system for transmitting to a receiver weather chart information involving a plurality of line intersects is provided. The weather chart is scanned to produce signals to denote the presence or absence of a line intersect. The signals are grouped with a first bit of each group being a coding signal. The coding signal comprises a pulse or mark to denote a line intersect in the subsequent group with a zero or the absence of a pulse denoting the absence of a line intersect. A printer at a receiver includes a number of dots adapted to be energized when a signal denoting a line intersect is applied thereto. The dots are subdivided into blocks each including dots corresponding to the number of transmitted bits in each group when a line intersect is denoted. The blocks are scanned and the coding signal is applied to the printer to switch the scanning operation from one block to the next in the absence of a line intersect. When a line intersect is indicated, all the subsequent dots in a block are scanned.

Figure 1A:
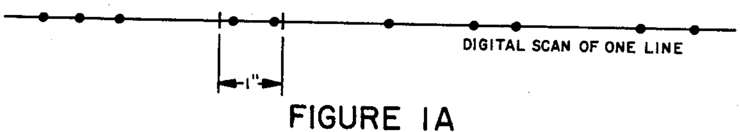
Figure 1B:
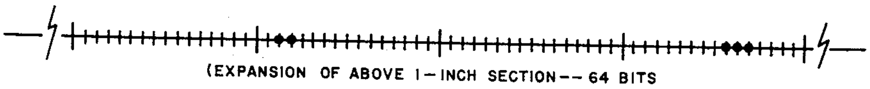
Figure 1C:
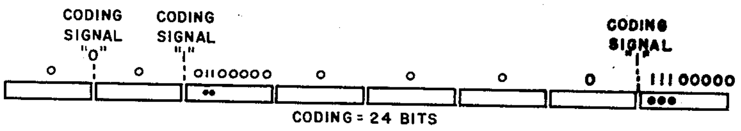
Figure 2:
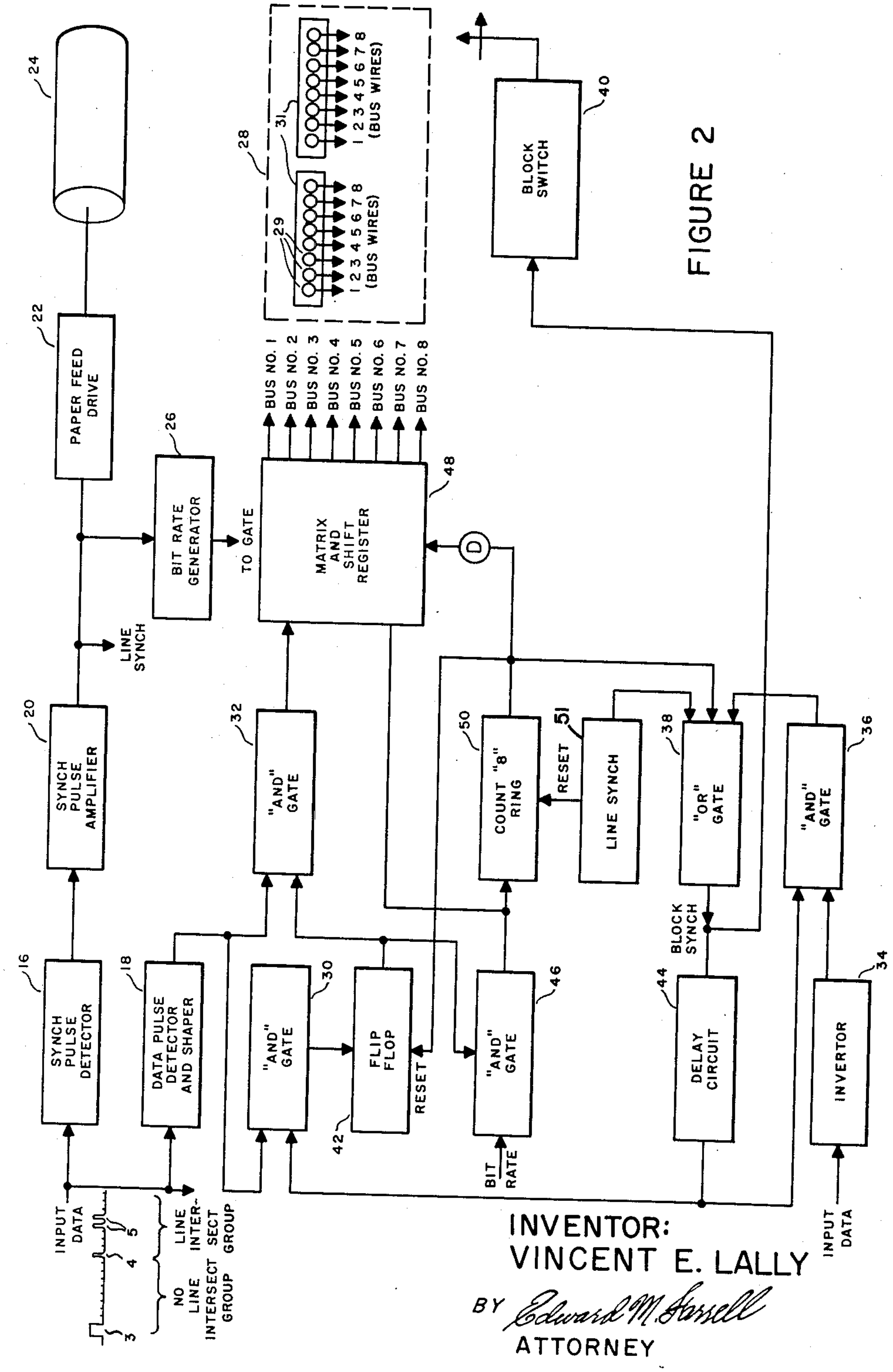

Other objects and advantages of the present invention will be apparent and suggest themselves to those skilled in the art to which the present invention is related from a reading of the following specification and claims in conjunction with the accompanying drawings, in which:

Figure 1 illustrates a weather chart of the type which may be communicated by a facsimile system, in accordance with the present invention;

Figure 1*a* represents a digital scan of one line of the weather chart illustrated in Figure 1;

Figure 1*b* represents an expansion of a 1" section of the line illustrated in Figure 1*a*;

Figure 1*c* illustrates a form of coding of the signals resulting from a digital scan, in accordance with the present invention; and, Figure 2 is a block diagram illustrating a receiving system which may be employed in practicing the present invention.

Before a detailed description, a discussion relating to the general theory relating to the present invention will be given. First, some of the advantages of a digital facsimile system will be described.

A digital facsimile may be defined as a system for reproducing an exact copy in which the printer consists of a series of small dots or points which can be remotely energized to produce a dark spot. Although it is possible to transmit grey level in such a system, the present invention is concerned with systems where dots are either energized to produce "black" spots or left unenergized to leave the surface of the paper associated with the printer "white."

One of the main advantages of a digital facsimile system is that no moving parts are involved in the receiver print system. This permits increased reliability, decreased cost, variable speed printing and flexible coding.

Another advantage of a digital facsimile system is that the bandwidth requirements are uniquely determined and performance of the system can be readily checked. The error-rate to be expected can be forecast, and the errors introduced by the telephone network may be separated from equipment malfunctions.

A digital facsimile system provides a system in which data may be readily encrypted. Also, the speed of transmission can be increased for a better communication link and decreased for poor links without any change in terminal equipment.

In considering the efficiency of a digital facsimile system in connection with the reproduction of a weather map or chart, a resolution of 64 points per inch will produce a resultant map considerably superior to a 120-line per minute facsimile and at least the equal of a 60-line per minute facsimile over long lines. If we assume a system operating at 1000 bits per second will be the standard link between transmitter and receiver, we can determine the speed of a 64-dot per inch digital facsimile, which will be assumed by way of example to be the speed used in the present invention. An 18-inch line will contain 1152 dots in such a system. A twelve inch map with 64 lines per inch will contain 768 lines. Total bits per map will be 884,736 and the total transmission time will be 885 seconds or 14.75 minutes. This in itself without applying the techniques of the present invention does not show any substantial improvement over the 19.2 minutes for transmission of the 60-lines per minute facsimile used in some conventional systems, even though resolution may be somewhat better.

Considerable speed improvement must be achieved for digital facsimile to be competitive with existing facsimile procedures. One way that this could be achieved is through the use of a system involving the transmission of considerably more than 1000 bits per second. This may be done if consideration is given to the degree of error rate which is permissible while still providing a satisfactory reproduction.

The advantages of a straightforward digital facsimile are vitiated by the poor speed of map transmission. We can overcome this defect by appropriate coding—provided that the system is designed for the information to be transmitted.

Consider the graphic characteristics of a weather chart. Neglecting the geography which can be added at the receiving station, a weather chart consists of 10 to 80 curving lines with a total length of 100 to 700 inches. In addition there must be numbers identifying the lines and a few letters of map identification. The station symbolic data which clutters most maps is, in general, redundant, and may be eliminated from all upper air charts. Some symbolic data may be kept on surface charts although not absolutely needed.

The average weather map may contain about 400 inches of lines. The system described in the aforementioned article is designed to take advantage of the continuity of lines and would be capable of achieving a 50 to 1 increase in efficiency if coding techniques and plotting techniques could be combined in a simple fashion. Unfortunately, mechanical limitations at the receiving station limit this improvement to a factor of about five at the present state of the art for mechanical plotters and digital programming.

Variable speed facsimile, "stopping-spot" scanning, and other digital encoding methods all provide improvements in efficiency because of the high percentage of white-to-black area, but none of these methods optimize efficiency in terms of the continuous nature of the lines to be transmitted.

If we wish to use the simplicity of a digital readout for facsimile with an efficient code to provide an increase in speed, then it is essential that we examine the characteristics of the chart to be transmitted. The average chart will have 30 to 40 lines with a total length of about 400 inches. If we consider the lines to consist of sinusoidal sections of amplitude "A," and period "T," we compute that in a raster scan we will strike 33 lines on each sweep for "$A$">>"$T$" on an 18" x 12" map with 400 inches of isolines. For values of "$T$">>"$A$" the number of strikes per scan drops to very low values, such as 2 or 3. For an intermediate value ("$A$"=1 inch and "$T$"=9 inches), the number of strikes per scan averages 14.

If we assume that the map consists of circular sectors, randomly oriented, the number of strikes per scan becomes 21.2. This value is independent of the radii of the circular sectors.

Let us assume that the number of strikes per scan is "$n$," recognizing that "$n$" lies somewhere between 3 (a map of almost straight horizontal lines), and 33 (a map consisting entirely of vertical lines).

We can develop a code which will optimize the transmission efficiency for any given "$n$." The 1152 dots of our digital print-out will be divided into blocks of "S" dots per block.

Total number of blocks=1152/$S$
Number of blocks including an isoline=$n$ (Since the blocks are small, we may assume a block never covers more than one isoline.)

$$\text{Number of blocks of white background}=\frac{1152}{S}-n$$

Now consider a code in which "0" represents a white block and a "1" followed by S bits of "0's" and "1's" represents a block containing a line intercept.

The average total number of bits per scan=

$$\underset{\text{(Black bits)}}{(S+1)n}+\underset{\text{(White bits)}}{\left(\frac{1152}{S}-n\right)}$$

For a given $n$, we can maximize S by differentiating the above with respect to S and letting the expression equal 0.

$$\frac{d}{ds}(f)=0=n-\frac{1152}{S^2}$$

$$S^2=\frac{1152}{n}$$

$$S=\frac{34}{\sqrt{n}}$$

We may now tabulate maximum values for reasonable values of $n$. ($8<N<24$) as follows:

| $n$ | S | Bits/per line | Ratio of Efficiency $\left(\frac{1152}{\text{bits per line}}\right)$ |
|---|---|---|---|
| 8 | 12 | 192 | 6.0 |
| 12 | 10 | 235 | 4.9 |
| 16 | 8 | 272 | 4.2 |
| 20 | 8 | 304 | 3.8 |
| 24 | 7 | 332 | 3.5 |

Referring now particularly to Figure 1, a typical weather chart 1 is illustrated. This chart comprises a number of lines representative of various weather conditions. In the present invention, means for transmitting information relating to this type of weather chart and the lines associated therewith are provided. In the present invention, as well as in many conventional facsimile systems, line scanning of the weather chart may be employed to produce signals to modulate a transmitter for transmission to a facsimile receiver. Any one of numerous different methods for scanning the weather chart 1, such as a flying spot scanner, may be employed. Such scanning methods are not shown or described in detail since they are well known to those skilled in the art.

One of the main features of the present invention relates to means for transmitting information relating to the line intersects of a weather chart. One line of a scanning operation of the weather chart 1 is represented by a line 2 which may be an electron beam sweeping across the weather chart. The weather chart 1 may be subdivided into units each corresponding to an elemental area of the chart. When the scan of the electron beam, for example, crosses a line indicative of weather information on the chart, a pulse signal may be produced. In the absence of a line intersect, no pulse signal is produced. Thus we can say that as the weather chart is scanned, a binary signal is produced with the presence of a pulse or mark denoting a line intersect and the absence of a pulse or zero denoting the absence of a line intersect.

Figure 1$a$ may be considered as representing the scanning line 2 to produce binary signals during the scanning operation. When the scanning line 2 crosses a line denoting weather information, a mark signal may be produced. This figure shows dots whenever the line 2 crosses weather information lines to produce mark signals. The absence of dots denotes no line crossing.

Figure 1$b$ illustrates an expanded one inch portion of the scanning line illustrated in Figure 1$a$. This expanded portion of the line may be considered as including 64 bits. A pulse or "mark" signal is produced when a line intersect is denoted. The time of occurrence of these pulses are illustrated in the form of dots. It is noted that more than one dot may be present to denote a line intersect since a particular line intersect may include more than one elemental area in the weather chart 1.

In Figure 1*c*, there is illustrated a method of coding the information illustrated in Figure 1*b*. If we consider eight elemental areas of the weather chart 1 as constituting a separate group, means employing the present invention may be provided for speeding up the transmission and reproduction time as well as minimizing the bandwidth requirements in facsimile systems involving weather charts.

If eight bits or elemental areas are considered as a group, some of the groups will contain pulse signals while other of the groups will not contain pulse signals, dependent upon the presence or absence of a line intersect during the scanning of the weather chart.

In practicing the present invention, a coding signal is provided immediately preceding each group of signals. This coding signal may be a binary signal having two characteristically different qualities, for example a "zero" signal indicating that none of the elemental areas scanned in the subsequent group of the weather chart includes a line intersect and a "mark" signal representing that the subsequent group of elemental areas of the weather chart includes pulse signals denoting a line intersect.

Various means for producing the coding signal may be employed. For example, one of the blocks illustrated in Figure 1*c* may be scanned. A memory device or storage circuit may be associated with the block to detect the presence or absence of a line intersect. When a line intersect is indicated, means for producing a "one" or mark coding signal may be used to indicate the presence of a line intersect within the particular scanned block. When no line intersect is indicated as a result of scanning of the block, a "zero" coding signal would be produced by circuitry associated with the memory device or storage circuit. Because the present invention is related primarily to the receiving system and not to the transmitting system or means for producing the coding signals, detailed means for producing such coding signals are not illustrated for purposes of clarity.

In considering the transmission of such a signal, no bits except bits relating to the coding signal need be transmitted when any of the groups following a coding signal do not include signals denoting a line intersect. Bits have to be transmitted only when a line intersect is indicated. Of course, as previously indicated, bits involving coding signals must be transmitted for each block. Thus the number of bits for information which must be transmitted is greatly minimized thereby permitting a speeding up of the transmission time as well as the reproduction time, as will be seen.

Referring particularly to Figure 2, an input data signal representing information signals relating to the weather chart 1 is applied to a synchronization pulse detector 16, a data pulse detector and shaper circuit 18, and an inverter circuit 34. The input data signal may include a line synchronization pulse 3, a coding pulse 4 and information data pulses 5.

The line synchronization pulse 3 is characteristically different than the coding pulse 4 or the information data pulses 5. For example, the pulse 3 may be wider in width or greater in amplitude than the coding or data pulses. The output signal from the synchronization pulse detector 16 is applied to an amplifier 20. The synchronization pulse detector 16 does not permit either the coding or data information pulse to pass therethrough. The output signals from the synchronization pulse generator 20 is applied to a paper feed drive amplifier 22. Each time a synchronization pulse is applied from the paper feed drive amplifier 22, a roller 24 is caused to turn a predetermined amount, for example 1/64 of an inch. The roller 24 may include conducting paper or other suitable material adapted to receive information corresponding to information contained in the weather chart 1. Means for synchronizing the roller 24 are well known to those skilled in the art and therefore is not described in detail.

In considering the data information signal, let us first assume that the signals received do not represent a line intersect, in which case a zero coding signal will be present. It is realized, of course, that when no line intersect is involved that there is actually no bit signal or time interval involved in the groups although a spacing representing eight elemental areas is indicated by way of example. Again, bit signals relating to the coding signal will be transmitted. Prior to the reception of a signal, a flip-flop circuit 42 and a counting circuit 50 are in the reset position.

When the coding signal representing "zero" is received, it is applied to the data pulse detector and shaper circuit 18. The output signal from the data pulse detector and shaper is applied to a pair of "and" gates 30 and 32. Since no signal is applied to the "and" gate 30 from a delay circuit 44, no output is attained therefrom. In like manner, since the flip-flop circuit 42 is in the reset position and does not provide an activating signal to the "and" gate 32, the "and" gate circuit 32 does not provide an output signal. Thus, the "zero" coding signal is effectively stopped at the gating circuits 30 and 32.

The input data signal is also applied to an inverter circuit 34, with the output from the inverter circuit being applied to an "and" gate circuit 36. The inverter circuit 34 inverts the "zero" coding signal to a "mark" signal. An output signal from the delay circuit 44 resulting from the application of a signal to an "or" gate circuit 38 is also applied to the "and" gate 30 and to the "and" gate circuit 36 after a one bit time delay. An output signal from the "or" gate circuit 38 to the delay circuit 44 results when a signal is applied to the "or" gate 38 from any of three sources, namely, a line synchronization source, a count ring circuit 50 or the "and" gate circuit 36. With two signals being applied to the "and" gate circuit 36, an output signal is applied to the "or" gate 38 to produce a block synchronization pulse which is applied to a block switch circuit 40. The output signal from the block switch circuit 40 is used to switch a scanning operation of a printer from block to block when no line intersect is denoted, as by the presence of a zero coding signal.

A printer 28 may include a plurality of dots or elemental areas 29 which are adapted to become energized when pulses are applied thereto. The dots are subdivided into blocks 31 with the number of dots included in each block corresponding to the number of elemental discrete areas of each group associated with the weather chart 1 at the transmitting station. When an output signal from the block switch circuit 40 is applied to the printer 28 during the scanning operation of the printer, the scanning is caused to switch from block to block without scanning the dots in the particular block. This condition occurs when a signal representing no line intersect is received. When a signal representing a line intersect is received, the scanning of each of the dots 29 occurs.

Let us now consider the operation of the system when a mark coding signal is received. This condition denotes that a line intersect is involved and that the subsequent group of signals will contain one or more binary pulses.

When a mark coding signal denoting a line intersect is received, it is applied from the data pulse detector and shaper circuit 18 to the "and" gate circuit 32. Since the flip-flop circuit 42 is reset to "zero," no output signal is developed from the "and" gate circuit 32. However, the "and" gate circuit 30 becomes energized since it receives the "one" signal from the data pulse detector and shaper circuit 18 as well as from the delay circuit 44. The pulse from the delay circuit 44 results from the previous block synchronizing pulse. The output signal from the "and" gate circuit 30 switches the operating state of the flip-flop circuit 42 to the "mark" position. The output signal from the flip-flop circuit 42 is applied to the "and" gate circuit 32 thereby opening it for the following pulses.

A bit rate generator circuit 26, periodically synchronized by the synchronization pulse, from a line synch source illustrated by a block 51 provides a continuous series of pulses bit rate. These pulses are applied to the "and" gate circuit 46. When the flip-flop circuit 42 provides a "mark" signal to the "and" gate 46, eight pulses are allowed to pass therethrough by the counting circuit 50. These eight pulses go also to the matrix and shift register 48. All "bits" passing through the "and" gate circuit 32 are applied to the matrix and shift register 48 and are stored for readout after the eight pulses have been counted. The output signal from the bit rate generator 26 may be supplied from a remote point through telephone lines from the signal derived from a digital data subset device.

The block 51 labeled "line synch" indicates a source of synchronization pulses such as illustrated by the wave form 3. It is noted that this is the same wave form appearing at the output of the synch pulse amplifier 20. This signal has been illustrated as being in two places in order to avoid the confusion of too many cross lines in the drawing and to make the description easier to follow. It is noted that the line synchronization pulses 3 may be supplied from some remote station to the receiving station as, for example, through a telephone line from equipment, such as a digital data subset device, which may separate or combine with the device which provides the bit rate signals.

After eight pulses have been counted, a pulse from the counting circuit 50 is applied to the matrix and shift register 48 to discharge the stored data to the appropriate dots of the blocks in the printer 28 through appropriate bus lines. At the end of eight pulses, the flip-flop circuit 42 is reset by a pulse from the counting circuit 50 thereby closing the gate circuits 30 and 32. The output pulse from the counting circuit 50 is also applied to the "or" gate circuit 38 to provide a block synchronization pulse to cause a switching operation in the printer 28 from one block to the next. The system is now ready to receive the next data input signal which may be "a zero" or "a mark" and the process is repeated.

It is seen that when no line intersect signals are involved, a switching operation will be obtained from block to block. This greatly reduces the amount of reproduction time as well as permitting transmission of information within a limited bandwidth.

It is apparent that various modifications may be employed in practicing the present invention. For example, the use of blocks having eight dots or elemental areas is not essential, since the number of dots in the blocks may be of any appropriate number and dependent upon the system involved.

Even a greater speed may be achieved by the use of different coding techniques. For example, the transmission of a single pulse per block to designate a line intersect would be possible when weather maps involving curving line segments are involved. Such a system would not be highly efficient for the transmission of numbers, symbols or straight horizontal lines. A coding system may be designed to optimize transmission with respect to these characteristics of the weather map, by considering that there exists more "white" than "black" and that the black areas are not randomly placed but appear at spaced intervals with a high degree of order. In developing a coding technique, for example, it may be considered that if the blocks involved are small, then any block looks exactly like the block above except for a shift of one or two spaces left or right where the block is pierced by a line. Various coding techniques to indicate shifts of line intersect if the weather chart is scanned from line to line may be employed.

Numerous other techniques may also be employed for high efficiency. For high speed reproduction, technique involving the block switching feature of the present invention makes possible a highly efficient system.

What is claimed is:

1. In a system for transmitting weather chart data involving a plurality of lines wherein said weather chart is scanned to produce signals to denote the presence or absence of a line intersect, means for grouping said signals with a coding signal denoting the start of each group, said coding signal having two characteristics, one when the subsequent group denotes a line intersect, the other when the subsequent group denotes the absence of a line intersect, the combination comprising a receiver for receiving said signals including said coding signal, a data reproduction device associated wtih said receiver including a plurality of discrete elements adapted to produce indicia when a signal denoting a line intersect is applied thereto, said discrete elements being subdivided into blocks each including discrete elements corresponding to the number of transmitted signals in each group when the presence of a line intersect is denoted, means for scanning said blocks, and means for applying said coding signal to said data reproduction device to switch the scanning operation from one block to the next in the absence of a line intersect and to cause scanning of all the discrete elements in a block when a line intersect is denoted.

2. In a system for transmitting data involving a plurality of lines wherein said lines are scanned to produce signals denoting either the presence or absence of a line, means for grouping said signals with a coding signal denoting the start of each group, said coding signal having one characteristic when the subsequent group of signals denotes the presence of a line and another characteristic when the subsequent group of signals denotes the absence of a line, the combination comprising a receiver for receiving said signals and said coding signal, reproduction means associated with said receiver responsive to produce indicia when a signal denoting a line is applied thereto, said reproduction means being subdivided into blocks, means for scanning said blocks, and means for applying said coding signal to said reproduction means to switch the scanning operation from one block to the next in the absence of a signal denoting a line and to cause scanning of said block in the presence of a signal denoting a line.

3. In a facsimile system for transmitting weather chart data having a plurality of elemental areas involving a plurality of lines wherein said weather chart is scanned to produce binary signals with a pulse denoting the presence of a line intersect and the absence of a pulse denoting no line intersect, means for grouping said elemental areas of said weather chart, means providing a binary coding signal denoting the start of each group, said coding signal including a pulse when the subsequent group denotes a line intersect and no pulse when the subsequent group denotes the absence of a line intersect, the combination comprising a facsimile receiver for receiving said binary signals including said coding signal, a printer associated with said receiver including a plurality of dots adapted to become energized to produce indicia when a signal denoting a line intersect is applied thereto, said dots being subdivided into blocks each including dots corresponding to the number of elemental areas of each group at said weather chart, means for scanning said blocks, and means for applying said coding signal to said printer to switch the scanning operation from one block to the next in the absence of a line intersect and to cause scanning of all the discrete elements in a block when a line intersect is denoted whereby a variable scanning rate is achieved dependent upon the number of line intersects at said weather chart.

4. In a facsimile system for the transmission of weather chart data involving a plurality of lines wherein said weather chart is scanned to produce binary pulse signals with a pulse denoting a line intersect and the absence of a pulse denoting no line intersect, means for grouping said binary pulse signals with a binary coding signal preceding each group, said binary coding signal being characterized by a pulse when the subsequent group includes a pulse denoting a line intersect and by the absence of a pulse when the subsequent group is absent of pulses denoting a line intersect, the combination comprising a facsimile receiver for receiving said binary signals including said coding signal, a printer associated with said facsimile receiver including a plurality of discrete elements adapted to be energized to produce indicia by the application of a pulse signal thereto, said plurality of discrete elements being subdivided into a number of blocks with the number of discrete elements within each block corresponding to the number of binary signals in each group of transmitted signals when a line intersect is denoted, means for scanning said blocks in said printer, and means for applying said coding signal to said printer to switch the scanning operation from one block to the next in the absence of a line intersect and to cause all the discrete elements in a block to be scanned when a subsequent group of signals denotes a line intersect whereby a variable scanning rate is provided dependent upon the number of line intersects in said weather chart.

5. In a facsimile system for transmitting weather chart data having a plurality of elemental areas involving a plurality of lines wherein said weather chart is scanned to produce binary signals with a pulse denoting the presence of a line intersect and the absence of a pulse denoting no line intersect, means for grouping said elemental areas of said weather chart, means providing a binary coding signal denoting the start of each group, said coding signal including a pulse when the subsequent group denotes a line intersect and no pulse when the subsequent group denotes the absence of a line intersect, means providing a synchronization signal for indicating the start of a line scanning operation, the combination comprising a facsimile receiver for receiving said binary signals including said coding and synchronization signals, a printer associated with said receiver including a plurality of dots adapted to become energized to produce indicia when a signal denoting a line intersect is applied thereto, said dots being subsdivided into blocks each including dots corresponding to the number of each group of elemental areas at said weather chart, means for sequentially line scanning said blocks, means for applying said coding signal to said printer to switch the scanning operation from one block to the next in the absence of a line intersect and to cause scanning of all the discrete elements in a block when a line intersect is denoted whereby a variable scanning rate is achieved dependent upon the number of line intersects in said weather chart, a shifting device associated with said printer, and means responsive to said synchronization signal to advance said shifting device for each scanned line during said scanning operation.

6. In a system for transmitting weather chart data involving a plurality of lines wherein said weather chart is scanned to produce signals to denote the presence or absence of a line intersect, means for grouping said signals with a coding signal denoting the start of each group, said coding signal having two characteristics, one when the subsequent group denotes a line intersect, the other when the subsequent group denotes the absence of a line intersect, the combination comprising a receiver for receiving said signals including said coding signal, a data reproduction device associated with said receiver including a plurality of discrete elements adapted to produce indicia when a signal denoting a line intersect is applied thereto, said discrete elements being subdivided into blocks each including discrete elements corresponding to the number of transmitted signals in each group when the presence of a line intersect is denoted, means for scanning said blocks, and means for applying said coding signal to said data reproduction device to switch the scanning operation from one block to the next in the absence of a line intersect and to produce indicia in some of the discrete elements in a block when a line intersect is denoted.

7. In a system for transmitting data involving a plurality of lines wherein said lines are scanned to produce signals denoting either the presence or absence of a line, means for grouping said signals with a coding signal denoting the start of each group, said coding signal having one characteristic when the subsequent group of signals denotes the presence of a line and another characteristic when the subsequent group of signals denotes the absence of a line, the combination comprising a receiver for receiving said signals and said coding signal, reproduction means associated with said receiver responsive to produce indicia when a signal denoting a line is applied thereto, said reproduction means being subdivided into blocks, means for scanning said blocks, and means for applying said coding signal to said reproduction means to switch the scanning operation from one block to the next in the absence of a signal denoting a line and to produce indicia in said block of said reproduction means in the presence of a signal denoting a line.

References Cited in the file of this patent

UNITED STATES PATENTS

| | | |
|---|---|---|
| 2,143,875 | Hansell | Jan. 17, 1939 |
| 2,738,499 | Sprick | Mar. 13, 1956 |
| 2,779,654 | Williamson | Jan. 29, 1957 |